UNITED STATES PATENT OFFICE.

WILLIAM R. ORNDORFF, OF ITHACA, NEW YORK, ASSIGNOR TO PARKE, DAVIS & COMPANY, OF DETROIT, MICHIGAN, A CORPORATION OF MICHIGAN.

PHENOL HALOGEN PHTHALEIN COMPOUND.

939,075.  Specification of Letters Patent.  Patented Nov. 2, 1909.

No Drawing.  Application filed April 22, 1909.  Serial No. 491,542.  (Specimens.)

*To all whom it may concern:*

Be it known that I, WILLIAM R. ORNDORFF, a citizen of the United States of America, residing at Ithaca, in the county of Tompkins and State of New York, have invented certain new and useful Improvements in Phenol Halogen Phthalein Compounds, of which the following is a specification.

The invention relates to a new class of compounds, which I have termed "phenol halogen phthaleins," and consists in the new chemical substance and in the process of manufacturing the same. The new body is a derivative of a phenol and a halogen phthalic acid, and is characterized by its laxative and purgative properties, and certain physical properties, as will be hereinafter described.

For the purpose of illustration, a specific compound in the class mentioned,—preferably a tetrachlorin derivative of phenolphthalein,—which I have named "phenol tetrachlorphthalein," will be described. This substance has the following formula:

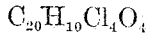

or structurally expressed:

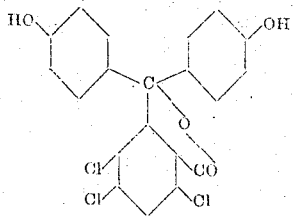

or—

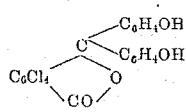

Briefly stated, it may be prepared by subjecting carbolic acid as a phenol to the action of tetrachlorphthalic acid or its anhydrid in the presence of a dehydrating agent.

More particularly, the full steps in the process are as follows: About 110 grams of tetrachlorphthalic acid or 100 grams of the anhydrid, 100 grams of concentrated sulfuric acid, and 200 grams of carbolic acid, are heated to a temperature of 145° to 150° C. for about twelve hours until the liquid mixture solidifies. When the reaction is completed, the mass is treated with a large excess of water, and steam is passed into the mixture. The crude phenol tetrachlorphthalein is then filtered off, washed with hot water, and dissolved preferably in a ten per cent. solution of sodium hydroxid. The alkaline solution is filtered, to remove a small amount of tetrachlorfluoran formed as a by-product, and hydrochloric or sulfuric acid is added in excess to precipitate the phenol tetrachlorphthalein, which is then filtered off, washed thoroughly with water, and dried. The reaction is represented by the following equation:

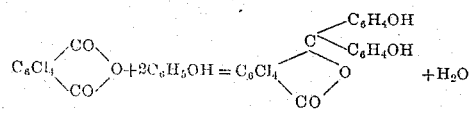

Theoretically, 100 grams of tetrachlorphthalic anhydrid should yield 159 grams of phenol tetrachlorphthalein. An average yield of 65% of the theoretical is obtained, using the proportions of materials as given above. The crude product, freed from the tetrachlorfluoran, is then purified by recrystallization from methyl or ethyl alcohols, using bone black to decolorize the solution, or it may be recrystallized from other solvents as acetone, ether, or acetic acid.

The new compound possesses valuable purgative or laxative properties, and the following physical characteristics: It is a colorless, crystalline body, the crystals being substantially rectangular plates soluble in warm ethyl alcohol, acetone, ether, glacial acetic acid, and in certain oils as olive oil, slightly soluble in chloroform and benzene, and insoluble in water and ligroin. In concentrated sulfuric acid it dissolves easily in the cold with a reddish yellow color, and is precipitated unchanged from this solution by water. It darkens slightly at approximately 308° C., and melts with decomposition at approximately 316° C. when heated in a sealed capillary tube. It dissolves readily in solutions of potassium, sodium and ammonium hydroxids or of the carbonates of the alkali metals, forming colored solutions of the salts. In concentrated alkaline solutions the color is red, in thin layers purple, while in dilute solutions it is violet-red. In very dilute alkaline solutions the color has a bluish tint, which distinguishes it from phenol phthalein. The addition of acids to the violet-red alkaline solution decolorizes it at once, and precipitates the colorless phenol tetrachlorphthalein. The addition of a large excess of the caustic alkalies to the violet-red dilute alkaline solution of the compound decolorizes it on standing, probably owing to the formation of the tripotassium or sodium salt of the carbinol carbonic acid. When administered by the mouth or hypodermically, it acts as previously stated as a valuable purgative or laxative.

The term "acid" in the specification and claims is used in its broad sense, and comprehends the acid proper or its anhydrid, either of which with the other ingredients described will produce the desired compound.

What I claim as my invention is,—

1. The herein-described process of forming phenol halogen phthaleins, consisting in subjecting a phenol and a halogen phthalic acid to the action of heat while in the presence of a dehydrating agent.

2. The herein-described process of forming phenol halogen phthaleins, which consists in heating a phenol and a halogen phthalic acid in the presence of a dehydrating agent until solidification of the mixture takes place.

3. The herein-described process of forming phenol halogen phthaleins, which consists in heating carbolic acid and tetra-chlorphthalic acid in the presence of a dehydrating agent and maintaining the heat at a high temperature until solidification of the mixture takes place.

4. A laxative compound, derived from a phenol and a halogen phthalic acid, characterized by its laxative action and the following physical properties: It is a colorless, tasteless and odorless crystalline body, soluble in methyl alcohol, acetone and ether, and insoluble in water; it dissolves in solutions of the alkalies, and is precipitated from these solutions by acids, and melts at approximately 316° C. when heated in a closed capillary tube.

5. The herein-described substance, derived from a phenol and a chlorphthalic acid, characterized by its laxative action and the following physical properties: It is a colorless, tasteless and odorless crystalline body, soluble in methyl and ethyl alcohols, acetone, ether, glacial acetic acid, and insoluble in water and ligroin, it dissolves in solutions of the alkalies or alkaline carbonates, and is precipitated from these solutions by acids, and melts at approximately 316° C. when heated in a sealed capillary tube.

6. The herein-described compound, derived from carbolic acid and tetrachlorphthalic acid, characterized by its laxative and purgative action, which is a colorless crystalline body without taste or odor, melts at approximately 316° C. when heated in a sealed capillary tube, is soluble in methyl and ethyl alcohols, acetone, ether, and glacial acetic acid, and insoluble in water and ligroin, it dissolves in solutions of the alkalies or alkaline carbonates with a red color, and is precipitated from these solutions by acids, and dissolves in the cold in concentrated sulfuric acid with a reddish yellow color, and is precipitated unchanged from this solution by water.

In testimony whereof I affix my signature in presence of two witnesses.

WILLIAM R. ORNDORFF.

Witnesses:
T. G. DELBRIDGE,
E. H. NICHOLS.